United States Patent
O'Connell

(10) Patent No.: US 7,500,452 B2
(45) Date of Patent: Mar. 10, 2009

(54) ANIMAL SORTATION

(75) Inventor: Patrick J. O'Connell, Lockney, TX (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 11/835,172

(22) Filed: Aug. 7, 2007

(65) Prior Publication Data

US 2008/0078336 A1 Apr. 3, 2008

Related U.S. Application Data

(63) Continuation of application No. PCT/US2006/004390, filed on Feb. 8, 2006.

(60) Provisional application No. 60/651,018, filed on Feb. 8, 2005.

(51) Int. Cl.
*A01K 1/00* (2006.01)

(52) U.S. Cl. .......................... 119/840; 49/168

(58) Field of Classification Search ............... 119/14.03, 119/516, 524, 840; 49/34, 147, 168
See application file for complete search history.

(56) References Cited

U.S. PATENT DOCUMENTS

| | | | |
|---|---|---|---|
| 435,225 A * | 8/1890 | Hoffman | ............... 52/36.1 |
| 661,987 A | 11/1900 | Hinks | |
| 1,220,636 A | 3/1917 | James | |
| 3,603,292 A | 9/1971 | Finch | |
| 3,861,359 A | 1/1975 | Pals | |
| 4,136,641 A | 1/1979 | Hoffman | |
| 4,567,851 A | 2/1986 | Larsen | |
| 4,715,321 A | 12/1987 | Vandenberg et al. | |
| 4,879,971 A | 11/1989 | Vandenberg et al. | |
| 5,259,335 A | 11/1993 | Moreau | |
| 6,019,061 A | 2/2000 | Schulte | |
| 6,427,632 B1 | 8/2002 | Horst et al. | |
| 6,481,156 B1 * | 11/2002 | Richmond | ............... 49/24 |
| 6,679,195 B1 | 1/2004 | Birk | |
| 6,814,026 B2 | 11/2004 | Guo | |

OTHER PUBLICATIONS

International Search Report of PCT/US06/04390 mailed Jul. 14, 2006 (1 pg).

* cited by examiner

*Primary Examiner*—Rob Swiatek

(57) ABSTRACT

A sorting assembly for sorting animals. The sorting assembly comprises a plurality of gates forming a visual barrier, each gate leading to a separate animals area. The gates are configured for movement between an opened position and a closed position. Only one gate may be in an opened position at a time. The gate in the opened position provides a contrast with gates in the closed position.

23 Claims, 3 Drawing Sheets

ANIMAL SORTATION

CROSS-REFERENCE TO RELATED APPLICATIONS

This application is a continuation of International Application No. PCT/US2006/004390 which was filed on Feb. 8, 2006, which claims priority to U.S. Application No. 60/651,018 filed on Feb. 8, 2005, the contents of both of which are incorporated in their entirety herein by reference

FIELD OF THE INVENTION

This invention relates generally to the sorting of animals, and more specifically to a sorting assembly for directing animals through selected gates.

BACKGROUND OF THE INVENTION

The handling of animals generally requires sorting and grouping the animals and moving the animals into various areas. Gates have been developed to direct animals into one of a plurality of pens for containing the animals. Typically, gates are provided along an alley. To sort the animals, an operator watches the animal and simply waits until the animal finds the open gate. The animal is typically not guided to the gate and it may take some time for the animal to find the open gate. This adds to the time needed for sorting the animals. Further, occasionally, for example when the animal becomes confused, the operator must trail the animal and direct the animal to the correct gate. This requires operator involvement and again adds to the time needed for sorting the animals.

BRIEF SUMMARY OF THE INVENTION

An assembly and method for sorting animals are provided.

In one embodiment, the assembly comprises a plurality of gates configured and arranged with respect to one another to form a visual barrier. The gates are vertically reconfigurable between an opened configuration and a closed configuration such that a gate in the opened configuration provides a visual contrast with gates in the closed configuration.

In a further embodiment, a sorting system comprises a plurality of gates configured and arranged with respect to one another to form a visual barrier. The gates are arranged in a holding area and each gate leads to a separate animals area. Each gate is reconfigurable between an opened position and a closed position such that a gate in an opened position provides a visual contrast to gates in a closed position. Only one gate may be in an opened position at any given time.

In yet a further embodiment, a sorting system is provided comprising a means for forming a visual barrier, the means for forming a visual barrier comprising a plurality of access means. Each access means leads to a separate animals area and is movable between an opened configuration and a closed configuration. An access means in an opened configuration provides a visual contrast with access means in a closed configuration.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

DETAILED DESCRIPTION OF THE INVENTION

Figure 1:
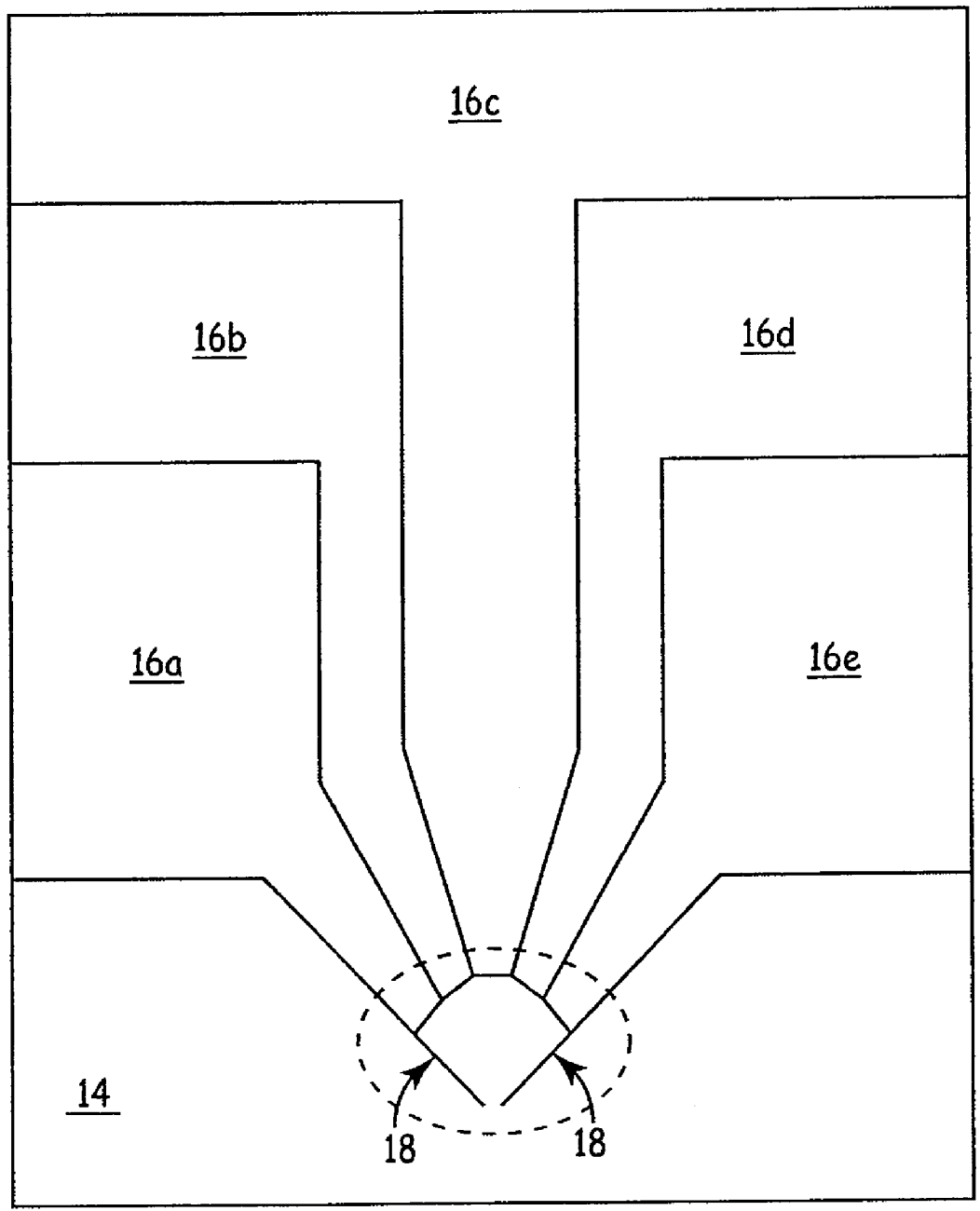
FIG. 1 illustrates a top plan view of a sorting assembly with associated pens in accordance with one embodiment of the present invention.

An animal sorting system is shown in FIG. 1 as a sorting assembly 10 suited for sorting animals. The sorting assembly 10 may be used for sorting and grouping any variety of animal or livestock including, for example, cattle. The sorting assembly 10 comprises a plurality of gates (doors, partitions, etc.) 12 (shown as 12a-12e in FIG. 2) through which an animal may move from a holding area or pen 14 to a separate animals area 16a-16e. The sorting assembly 10 uses the natural instinct of an animal to go towards an opening when allowed to escape. The sorting assembly 10 therefore is configured to focus the animal's attention on the desired gate opening. The sorting assembly 10 comprises a plurality of gates 12 set in a pattern. The gates 12 are configured and set in a pattern with respect to one another to form a visual barrier. For example, the gates 12 may be contiguous with one another, or contiguous in a pattern with dividing walls between gates. The gates (and dividing walls, if provided) may be a web of material or other opaque sheet, may be substantially solid, or may be a dark color. Thus, the gate, as set, provide a substantially continuous visual barrier and opening of a gate provides an obvious opening to the animal.

Figure 2:
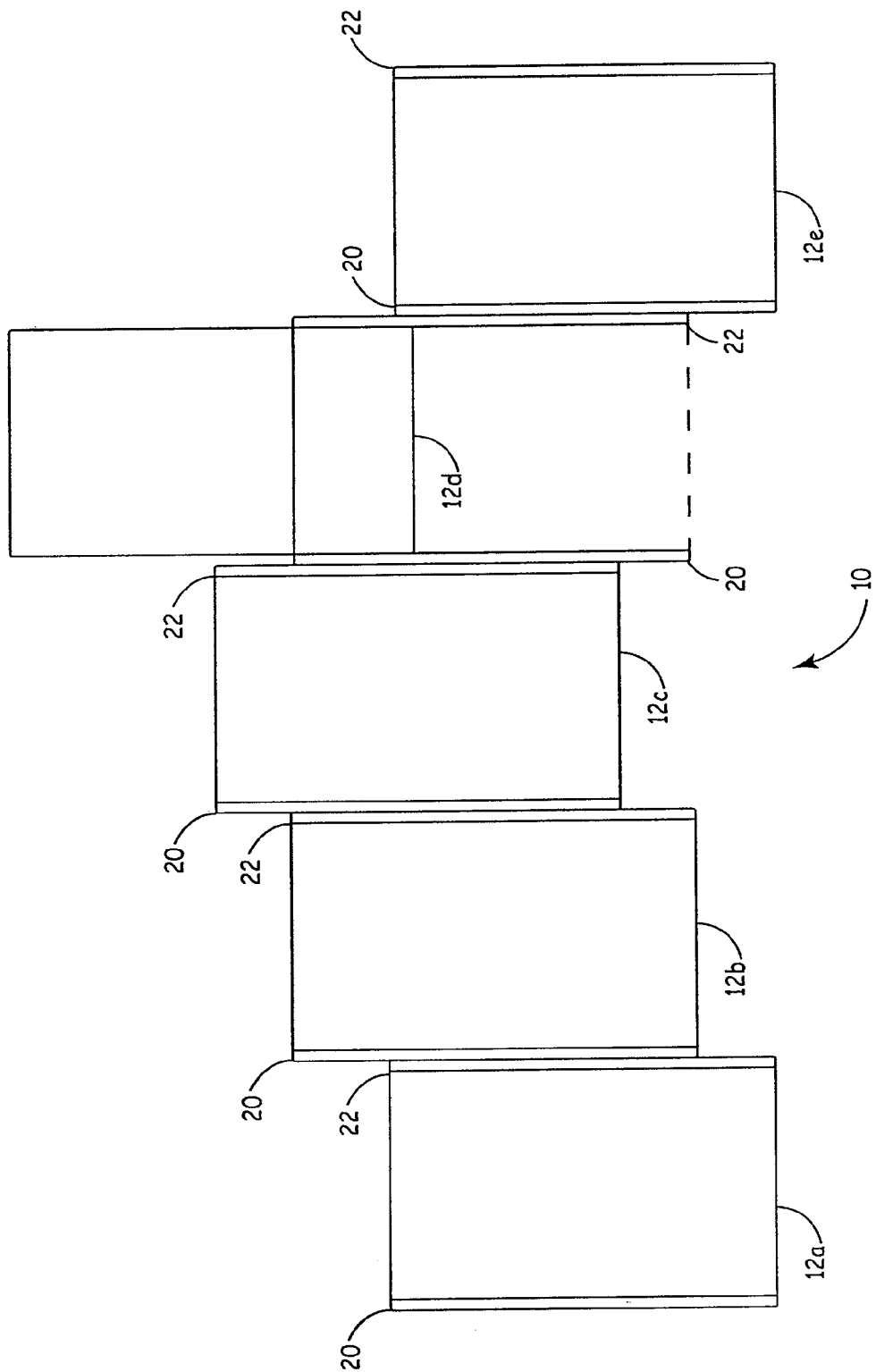
FIG. 2 illustrates a front elevation view of a sorting assembly in accordance with one embodiment of the present invention.

FIGS. 1 and 2 illustrate a sorting assembly 10. FIG. 1 illustrates a top plan view of the sorting assembly 10 wherein each gate 12 leads to a separate area 16a-16e. Each area 16a-16e is associated with a particular gate 12a-12e. FIG. 2 illustrates a front elevation view of the sorting assembly 10 according to another embodiment. In the embodiment of FIG. 1, the gates are arranged at differing angles to one another. In the embodiment of FIG. 2, the gates are arranged substantially parallel to one another. As shown, according to the embodiments of FIGS. 1 and 2, the sorting assembly 10 is set in a semicircle pattern in a holding pen 14. More particularly, the gates 12 are set in a semicircle pattern. Alternately, the gates 12 of the sorting assembly 10 may be set in a substantially linear pattern, a rectangular pattern wherein one side of the rectangle is open, or any other pattern wherein the gates form a visual barrier to the animal. Generally, the holding pen 14 is a confined space of less area while the separate areas 16a-16e are open spaces of greater area. In alternative embodiments, the respective sizes of the holding pen 14 and the areas 16a-15e may vary.

The sorting assembly 10 as shown comprises five gates 12a-12e. Alternatively, any number of gates may be provided. Each gate 12a-12e is associated with a separate area 16a-16e. Generally, in the livestock industry, animals may be selected for a variety of procedures. For example, an animal may undergo an weighing, be tagged, or other. After processing, the animal is typically released into a chute or passageway. Such chute or passageway may be provided leading to the holding pen 14 shown in FIG. 1.

The gates 12 may be formed of any suitable material. For example, suitable materials for the gates include plywood, sheet metal, other solid material, or other suitable material that creates a visual barrier. In an alternative embodiment, the gates may be formed of a webbed material. In one embodiment, the gates 12 are formed of a dark material. In an alternative embodiment, the gates are formed of a light material and are darkened, for example by painting. By using gates of a dark color, opening of a gate provides heightened contrast such that the animal's attention is drawn to the opening.

Sidewalls 18 of the holding pen 14 may also be formed as substantially solid such that the animal's attention is not directed to the sidewalls 18. Dividing walls may also be provided between the gates such that each gate is separated from the next gate by a dividing wall. The sidewalls 18 and/or dividing walls may be formed of any suitable material. For example, suitable materials for the sidewalls and/or dividing walls include piped fencing, plywood, barbed wire or other material.

Figure 3:
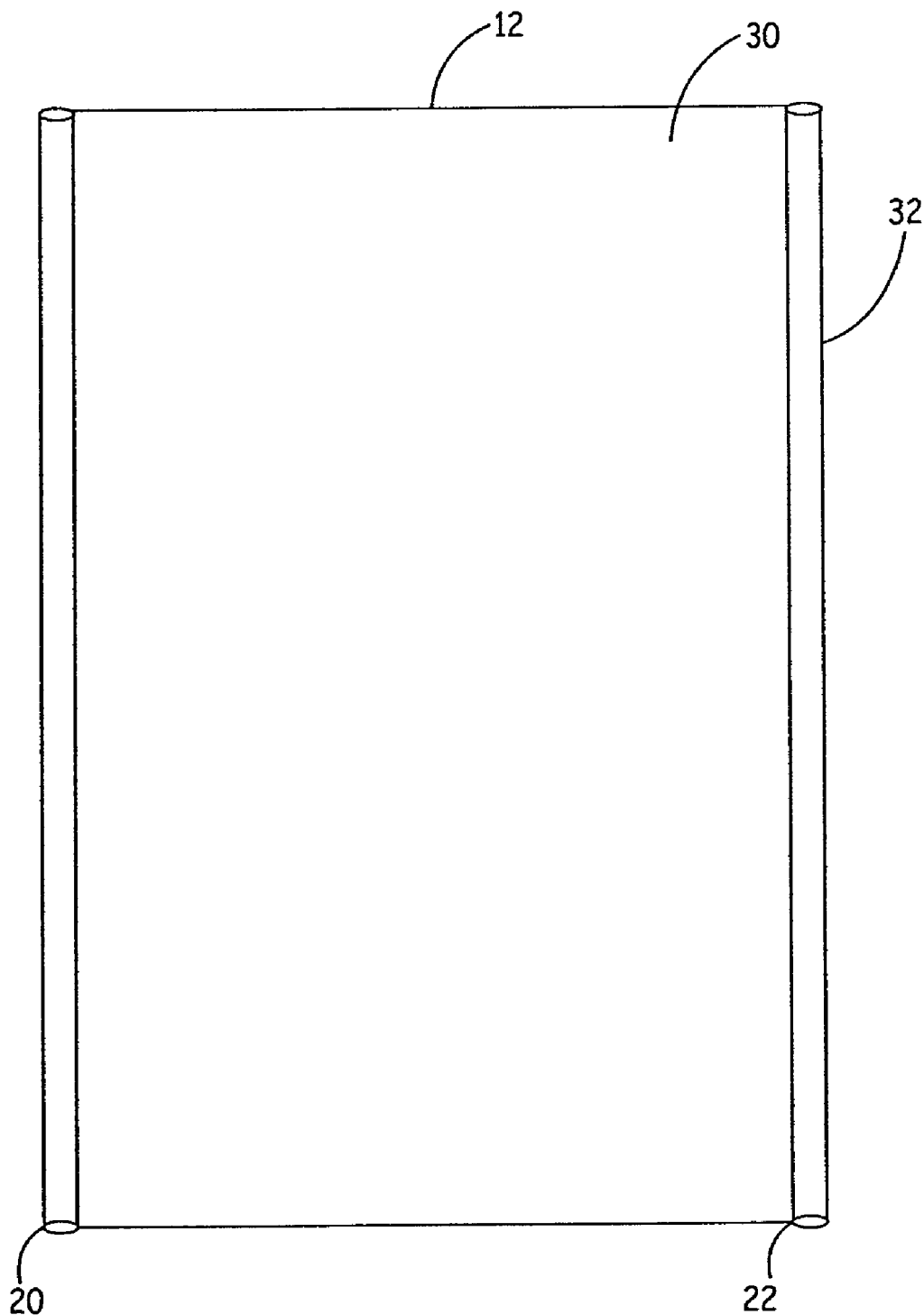
FIG. 3 illustrates a perspective view of a gate for use with a sorting assembly in accordance with one embodiment of the present invention.

In certain embodiments, the gates 12 are selectively reconfigurable with vertical movement between an "up" position and opened configuration and a "down" position and closed configuration. See for example, FIG. 2. When a gate 12 is opened vertically, the structure of the gate 12 is substantially removed from the view of the animal. Further, gates configured for vertical opening are generally more compact than gates configured for horizontal opening and do not require additional clearance for opening. Thus, configuring the gates 12 for vertical opening enables the sorting assembly to be compact. Alternatively, however, the gates may be configured for horizontal or other opening. As shown in FIGS. 2 and 3, each gate 12 comprises first and second vertical gate posts 20, 22 on first and second sides of the gates. The gate 12 extends between the first and second gate posts 20, 22. During vertical opening of the gates 12, the gate posts 20, 22 operate as rails along which the gate 12 may travel.

Any suitable driving mechanism may be used for powering the gates between the opened configuration and the closed configuration. For example, air, hydraulic, cable, or other power may be used. In one embodiment, pneumatic cylinders are used for operating the gates. Such driving mechanism may be coupled to the gates as is known in the art. In an alternative embodiment, a crank or other manual mechanism may be used for opening and closing the gates.

A control system 24 may be provided for controlling opening and closing of the gates 12. In one embodiment, the control 24 is configured for single-button selection of the gate 12 to be opened. Single-button selection eliminates need for the operator to track which gate is desired for opening as well as which gate should be closed. In such embodiment, a single button stroke indicates a gate to be opened. Such indication further indicates that all other gates should be closed. Thus, the operator may choose which gate to open and, upon pressing the button (or other input device). The input device sends a signal to a control system to activate opening of that gate and closing of all other gates. The control system provides an output signal to the gates, opening the selected gate and closing all other gates. When one gate is designated for opening, all other gates are designated to be closed. A control 24 is shown schematically in FIG. 1. As shown, the control 24 is remote from the holding pen 14 such that the operator need not be physically located in the holding pen 14 to operate the sorting assembly 10. If desired, the control 24 may be located within or adjacent the holding pen 14. Alternatively, any other suitable control device may be used.

The control system 24 may include a computing device, microprocessor, controller, or programmable logic controller (PLC) for implementing a control program, and which provides output signals based on input signals provided by the operator, by a sensor, or that are otherwise acquired. Any suitable computing device of any type may be included in the animal sortation system according to other exemplary embodiments. For example, computing devices of a type that may comprise a microprocessor or microcomputer or programmable digital processor, with associated software, operating systems, and/or any other associated programs to implement the control program may be employed. The control system and its associated control program may be implemented in hardware, software, firmware, or a combination thereof, or in a central program implemented in any of a variety of forms (e.g., hardware and/or software and/or firmware) according to other exemplary embodiments.

The sorting assembly 10 thus provided is compact and allows for retrofitting of animals working areas. Retrofitting may be accomplished by arranging the gates leading to the animals areas 16*a*-16*e* to be in a pattern such that opening of one gate substantially draws attention of an animal within holding area 14 to that gate. The gates 12*a*-12*e* to each of the animals areas 16*a*-16*e* may be retrofit as vertically opening, dark gates. The gates 12*a*-12*e* form a visual barrier to the animal. Opening of one gate, thus, provides a visual opening to which the animal is drawn. Depending on the configuration of the existing animals working areas, dividing walls may be provided between the gates 12*a*-12*e*.

Although the invention has been described with reference to preferred embodiments, persons skilled in the art will recognize that changes may be made in form and detail without departing from the spirit and scope of the invention.

What is claimed is:

1. A system for sorting animals comprising: a plurality of gates configured and arranged with respect to one another to form a visual barrier, the gates being vertically reconfigurable between an opened configuration and a closed configuration, wherein a gate in the opened configuration provides a visual contrast with gates in the closed configuration and further comprising a control device that may be operated to open a selected gate and close any gate not selected wherein the control device is configured for selection of the gate to be opened wherein the selection of the selected gate to be opened designates all other gates be closed.

2. The system of claim 1, wherein the gates are substantially solid.

3. The system of claim 1, wherein the plurality of gates are arranged with respect to one another to form a semi-circle pattern.

4. The system of claim 3, further comprising dividing walls between the gates.

5. The system of claim 4, wherein the dividing walls are substantially solid.

6. The system of claim 1, wherein the gates are formed of a web of material.

7. The system of claim 6, wherein the gates are formed of an opaque sheet.

8. The system of claim 1, wherein the gates are a dark color.

9. The system of claim 1, wherein the gates are arranged in a holding area and each gate leads to a separate animals area.

10. The system of claim 9, wherein the holding area comprises a plurality of sidewalls.

11. The system of claim 10, wherein the sidewalls are substantially solid.

12. The system of claim 1, wherein the gates are operated using hydraulic power.

13. The system of claim 1 in combination with a plurality of cattle animals.

14. A sorting system comprising: a plurality of gates configured and arranged with respect to one another to form a visual barrier, the gates being arranged in a holding area and each gate leading to a separate animals area, each gate being reconfigurable between an opened position and a closed position, wherein a gate in an opened position provides a visual contrast to gates in a closed position and wherein only one gate may be in an opened position at any given time and further comprising a control device that may be operated to open a selected gate and close any gate not selected wherein the control device is configured for selection of the gate to be opened wherein the selection of the selected gate to be opened designates all other gates be closed.

15. The system of claim 14, wherein the gates are one or more of substantially solid and a dark color.

16. The system of claim 14, further comprising dividing walls between the gates.

17. The system of claim 16, wherein the dividing walls are one or more of substantially solid and a dark color.

18. The system of claim 14, wherein the plurality of gates are arranged with respect to one another to form a semi-circle pattern.

19. The system of claim 14, wherein the control device is remote from the holding area.

20. A method for providing a sorting system comprising: providing gates for separate animals areas, each gate being reconfigurable between an opened configuration and a closed configuration and being at least one of substantially solid or a dark color; arranging the gates as a visual barrier; arranging the gates with a vertical mount for moving between an opened configuration and a closed configuration, wherein reconfiguring a gate into the opened configuration provides a contrast against gates in the closed configuration and further comprising providing a control device that may be operated to open a selected gate and close any gate not selected wherein the control device is configured for selection of the gate to be opened wherein the selection of the selected gate to be opened designates all other gates be closed.

21. The method of claim 20, wherein arranging the gates as a visual barrier comprises providing dividing walls between the gates wherein the dividing walls are one or more of substantially solid and a dark color.

22. The method of claim 20, comprising sorting a plurality of cattle animals.

23. A sorting system for sorting animals comprising: a means for forming a visual barrier, the means for forming a visual barrier comprising a plurality of access means wherein each of the plurality of access means leads to a separate animals area, each of the access means being movable between an opened configuration and a closed configuration, wherein an access means in an opened configuration provides a visual contrast with access means in a closed configuration and further comprising a control means that may be operated to open a selected gate and close any gate not selected wherein the control means is configured for selection of the gate to be opened wherein the selection of the selected gate to be opened designates all other gates be closed.

* * * * *